(12) United States Patent
Dietz et al.

(10) Patent No.: US 12,491,410 B2
(45) Date of Patent: Dec. 9, 2025

(54) MULTI-LAYER GOLF BALL WITH THERMO-REVERSIBLE COVALENT ADAPTABLE NETWORK

(71) Applicant: Acushnet Company, Fairhaven, MA (US)

(72) Inventors: Kevin J. Dietz, Fall River, MA (US); Michael Michalewich, Norton, MA (US)

(73) Assignee: Acushnet Company, Fairhaven, MA (US)

( * ) Notice: Subject to any disclaimer, the term of this patent is extended or adjusted under 35 U.S.C. 154(b) by 129 days.

(21) Appl. No.: 18/115,153

(22) Filed: Feb. 28, 2023

(65) Prior Publication Data
US 2024/0293701 A1  Sep. 5, 2024

(51) Int. Cl.
*A63B 37/06* (2006.01)
*A63B 37/00* (2006.01)
*C08F 132/04* (2006.01)

(52) U.S. Cl.
CPC ...... *A63B 37/0039* (2013.01); *A63B 37/0024* (2013.01); *A63B 37/0075* (2013.01); *C08F 132/04* (2013.01); *A63B 2209/00* (2013.01)

(58) Field of Classification Search
CPC .......................... A63B 37/0039; A63B 37/0075
See application file for complete search history.

(56) References Cited

U.S. PATENT DOCUMENTS

2003/0032758 A1*  2/2003  Harris ............... A63B 37/0003
                                                528/62
2021/0275874 A1*  9/2021  Hinton ............. A63B 37/0048

OTHER PUBLICATIONS

Thiessen, Merlina et al., "Influence of the Glass Transition Temperature and the Density of Crosslinking Groups on the Reversibility of Diels-Alder Polymer Networks", Polymers, 2021, 13, pp. 1-21; https://doi.org/10.3390/polym13081189.

(Continued)

*Primary Examiner* — Raeann Gorden
(74) *Attorney, Agent, or Firm* — Bradley Arant Boult Cummings LLP (57) ABSTRACT

Compositions including a base polymer and diene functional groups and/or dienophile functional groups attached to and crosslinking the base polymer, and golf balls made from such compositions are disclosed. The type and concentration of the components in the compositions, including the base polymer, the diene functional groups, and the dienophile functional groups, affect the hardness and resiliency of golf ball components made from such compositions, and thus, can be used to produce a golf ball having desirable performance characteristics. The compositions of the present disclosure may also be used in adjacent golf ball components to create crosslinks between such components that affect the adhesion between such golf balls components and, thus, can be used to produce a golf ball having increased durability. Golf ball components made from the compositions of the present disclosure may also have increased recyclability.

15 Claims, 3 Drawing Sheets

(56) References Cited

OTHER PUBLICATIONS

Ye, Lin et al., "Synthesis and Characterization of Butyl Acrylate-based Graft Polymers with Thermo-responsive Branching Sites via the Diels-Alder Reaction of Furan/Maleimide", Chinese Journal of Polymer Science, 2018, 36, pp. 1011-1018.

Scheutz, Georg M., et al. "Adaptable Crosslinks in Polymeric Materials: Resolving the Intersection of Thermoplastics and Thermosets", Journal of the American Chemical Society, 2019, 141, pp. 16181-16196.

* cited by examiner

MULTI-LAYER GOLF BALL WITH THERMO-REVERSIBLE COVALENT ADAPTABLE NETWORK

FIELD OF THE INVENTION

The present disclosure relates generally to compositions for use in golf ball components that facilitate crosslinks within the components and between different components to form a thermo-reversible covalent adaptable network (CAN). In some respects, the present disclosure provides compositions and golf ball components made from such compositions that provide the ability to tailor and/or improve certain ball performance results when such components are used in a golf ball. More particularly, the present disclosure relates to golf ball cores having a tailored hardness and/or resiliency that, when used in golf balls, provides the ability to achieve one or more desired performance characteristics including, for example, distance on driver shots and/or spin on short distance shots. In addition, the compositions of the present disclosure result in golf balls with improved interlayer adhesion strength and shear durability (as compared to conventional golf balls). More particularly, the present disclosure provides compositions and golf ball components made from such compositions that provide increased shear durability and increased adhesion strength when such components are used in a golf ball. Golf balls and golf ball components made from compositions of the present disclosure may also be more easily recycled than golf balls formed from conventional compositions.

BACKGROUND OF THE INVENTION

The flight performance and durability of a golf ball is affected by a variety of factors including the materials, weight, size, dimple pattern, and external shape of the golf ball. As a result, golf ball manufacturers are constantly improving or tweaking the materials and construction of golf balls in an effort to make incremental gains in performance without sacrificing durability.

For example, the resiliency and rebounding performance of a golf ball are generally driven by the composition and construction of the golf ball components. The coefficient of restitution (CoR) is a direct measure of the resilience of a golf ball at a particular inbound velocity. A golf ball's CoR is the ratio of the relative velocity of the ball after direct impact to that before impact. One way to measure the CoR is to propel a ball at a given speed against an ungiving surface and measure its incoming velocity and outgoing velocity. The CoR is defined as the ratio of the outgoing velocity to the incoming velocity of a rebounding ball and is expressed as a decimal. The CoR can vary from zero to one, with one being equivalent to an elastic collision and zero being equivalent to an inelastic collision. A golf ball with a high CoR value will generally have an increased initial velocity and increased distance on a given shot compared to a golf ball with a low CoR value. A golf ball with a high CoR value may be particularly desirable for less skilled or weaker players, such as recreational players, children, seniors, or disabled players.

As another example, the spin rate and feel of the ball also are important properties that are affected by the composition and construction of the layers of the golf ball. The spin rate refers to the rate of rotation of the golf ball after being hit with a club. One factor that affect the spin rate of a golf ball is the hardness of the various components of the golf ball. Altering the hardness of different layers may affect the spin rate of a golf ball in different ways. For example, decreasing the hardness of a cover layer may increase the spin rate of the golf ball (with all other factors being held equal). In contrast, increasing the hardness of the core or a casing layer may increase the spin rate of the golf ball (with all other factors being held equal). Moreover, increasing the difference between the hardness of the outside of the core while maintaining or decreasing the hardness at the center of the core (i.e., increasing the hardness gradient of the core) may affect the spin rate differently for driver shots and short distance shots. More specifically, an increase in the hardness gradient may result in a 15 percent increase in spin rate on short distance shots but only a 5 percent increase in spin rate on driver shots.

The hardness and resilience of a golf ball are constrained by the compositions used to form various golf ball components. The resilience of a golf ball may also be influenced by the ambient environmental conditions during manufacturing and storage. As a result, golf ball manufacturers are constantly monitoring manufacturing conditions and adjusting the compositions of golf ball components to maintain the targeted properties of golf balls, such as the hardness or CoR.

One issue with the multi-piece golf balls commonly used in modern play is the lack of adhesion between layers of the golf ball. Adhesion strength is a direct measure of the adhesion between two or more layers of a golf ball. The adhesion strength between two layers can be measured as the force required to separate the two layers. Low adhesion strength between layers of a golf ball may result in the golf ball having low shear durability. Golf balls having a low shear durability may delaminate more frequently when exposed to a shear force. Delamination is decoupling of an outer layer of the golf ball, such as the cover of the golf ball, from an adjacent inner layer, such as a casing layer. Delamination commonly occurs when a golf ball is struck with a high-angle club, such as a wedge, that imposes a strong shear force on the golf ball. As a result of the shear force, the outer and inner layers may move in different directions or at different speeds and decouple from each other. Delamination may be visibly apparent as "bubbling" or air pockets between layers or as cutting in the cover of the golf ball. Delamination detrimentally affects not only the appearance of the golf ball but the performance as well.

Currently, several different types of adhesion promoting pre-treatment processes exist for addressing cut and shear issues caused by lack of adhesion between adjacent layers. Examples of pretreatments include surface roughening; surface energy modifications such as corona, plasma, and flame treatments; adhesives; adhesion promoters and combinations thereof. Adhesives are typically applied via spray or dip and usually require a drying and post cure step. Adhesion promoters are likewise usually applied by dip or spray, followed by rinsing and drying steps. For golf balls having a cast urethane cover disposed on a casing layer, the casing layer must be treated with primer to increase adhesion between the casing layer and cover and decrease the likelihood of delamination. These adhesion promoting processes increase the adhesion strength between layers and the overall durability of the golf ball but require expensive materials and additional steps in the manufacturing process, which increases manufacturing time and cost.

Another issue with modern multi-layer golf balls is that, like any other unused piece of sports equipment, golf balls that are no longer being played or playable become solid waste. Likewise, scrap materials from the production of new golf balls or golf balls that are rejected during the production process for one reason or another must be disposed of in some manner. Typically, such golf ball waste ends up being mixed with other municipal solid waste and put in landfills.

Recycling polymer materials from waste golf balls is difficult as the polymers used to form the layers of a golf ball are often thermoset. Thermoset materials are difficult to recycle as they have a permanent network structure that cannot be broken down without specialized chemical processes. One method of reclaiming thermoset polymer materials from golf ball waste is to grind the waste material into a particulate, referred to as a regrind, which can then be added into the compositions used to make the components of new golf balls. However, recycling waste thermoset polymer materials from golf balls into regrind only allows the material to be used as a filler in the new composition as the regrind pieces still retain their permanent network structure and do not fully integrate into the composition. This, in turn, limits how much regrind may be added to the composition as including too much regrind may have a negative effect on the performance characteristics and durability of the golf ball. It would be beneficial to recycle polymer materials from waste golf balls into virgin-like materials that can be included into the new compositions in larger quantities without affecting the performance of a golf ball made from such components.

Thus, it would be advantageous to have compositions for use in the components of golf balls that improve the durability and recyclability of the golf ball while still providing desirable playing properties. The present invention provides such compositions and golf balls including components made with such compositions.

SUMMARY OF THE INVENTION

The present invention relates to a golf ball including a core; a casing layer disposed on the core and formed from a composition having diene functional groups and dienophile functional groups, wherein the diene and dienophile functional groups are crosslinked; and a cover disposed on the casing layer. In some embodiments, the composition of the casing layer forms a covalent adaptable network, which may be a thermo-reversible covalent adaptable network. In other embodiments, the diene and dienophile functional groups may be crosslinked via a Diels-Alder reaction and form dynamic covalent bonds.

In some embodiments, the composition includes a base polymer, and the diene and dienophile functional groups may be attached to and crosslink the base polymer. The diene functional groups may be formed from furan or a furan derivative. The dienophile functional groups may be formed from maleimide or a maleimide derivative. In some embodiments, the base polymer may be selected from the group consisting of polyethylene, polyacrylate, and hybrids, copolymers, and blends thereof. In other embodiments, the base polymer may be an ionomer. In still other embodiments, the golf ball may have a coefficient of restitution between about 0.700 and about 0.950. In yet other embodiments, the core includes a rubber formulation including a base rubber, and wherein the base rubber is a polybutadiene rubber, butyl rubber, or a blend thereof.

The present invention also related to a golf ball including a core; a casing layer disposed on the core and formed from a composition having a crosslinked base polymer; and a cover disposed on the casing layer, wherein the base polymer includes the following linkage:

In some embodiments, the linkage is a dynamic covalent bond. In other embodiments, the composition may include diene functional groups and dienophile functional groups, and the diene and dienophile functional groups may be attached to and crosslink the base polymer. In still other embodiments, the base polymer is selected from the group consisting of polyethylene, polyacrylate, and hybrids, copolymers, and blends thereof. In some embodiments, the diene functional groups may be formed from furan or a furan derivative. In other embodiments, the dienophile functional groups may be formed from maleimide or a maleimide derivative.

The present invention further relates to a golf ball including a core; a casing layer disposed on the core and formed from a casing composition having diene functional groups; and a cover disposed on the casing layer, wherein the cover is formed from a cover composition having dienophile functional groups, and wherein the diene functional groups and dienophile functional groups are crosslinked. In some embodiments, the casing composition and cover composition each include base polymers, wherein the diene functional groups may be attached to the base polymer of the casing composition, wherein the dienophile functional groups may be attached to the base polymer of the cover composition, and wherein the diene and dienophile functional groups crosslink the base polymers of the casing and cover compositions. In other embodiments, the base polymer of the cover composition is selected from the group consisting of polyurethanes, polyureas, and hybrids, copolymers, and blends thereof. In still other embodiments, the golf ball has an adhesion strength between the casing layer and cover, and wherein the adhesion strength ranges from about 18 lb/in to about 40 lb/in. In yet other embodiments, the composition of the casing layer further includes dienophile functional groups, and wherein the diene functional groups in the composition of the casing layer are in stoichiometric excess of the dienophile functional groups in the composition of the casing layer.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The present disclosure relates to compositions that may be crosslinked to form thermo-reversible covalent adaptable networks (CANs), components including such compositions, and golf balls including such components. More specifically, the compositions of the present disclosure may be used to form a core, casing layer, cover layer, or any other component of a golf ball having a desired degree of crosslinking within the component or between components. In some respects, the tailorable nature of the degree of crosslinking within a component made from a composition of the present disclosure may result in golf balls having a desired hardness or resiliency. This in turn may provide the ability to increase or reduce the spin of the golf ball or the distance the distance traveled by the golf ball when compared to a conventional golf ball hit under the same conditions. In other respects, the compositions and methods described herein may result in golf balls with improved shear durability and increased adhesion between layers (as compared to golf balls that do not include the components formed from compositions of the present disclosure). The compositions and the components and golf balls formed therefrom are discussed in more detail below.

Crosslinking Compositions

Golf balls of the present disclosure may have a single or multi-layered core, a single or multi-layered casing, and/or a single or multi-layered cover. As discussed in more detail below, one or more layers of the core, casing, or cover may be formed from a composition including a base polymer and one or more other components. Concentrations of components are in weight percent (wt %) unless otherwise indicated. As used herein, the term, "weight percent," also known as "percent by weight" or "wt %" is defined as the weight of a particular component present in a mixture, relative to the weight of the mixture as a whole. Mathematically, this can be expressed as the weight of an ingredient divided by the total weight of the mixture, multiplied by a factor of 100.

The base polymer may be a variety of materials depending on the desired characteristics and performance of a golf ball having a cover including the base polymer. Examples of materials suitable for use as the base polymer include, but are not limited to, polyurethanes; polyureas; copolymers, blends and hybrids of polyurethane and polyurea; polyethylene, including, for example, low density polyethylene, linear low density polyethylene, and high density polyethylene; copolymers of ethylene such as, for example, copolymers of ethylene and vinyl acetates, acrylates, methyl acrylates, acrylic acids, methacrylic acids, propylenes, dienes, and combinations thereof; polypropylene; rubber-toughened olefin polymers; plastomers; flexomers; polybutadiene, polystyrene; polyketones; polyacrylates; polymethacrylates; styrene/butadiene/styrene block copolymers; styrene/ethylene-butylene/styrene block copolymers; dynamically vulcanized elastomers; polyvinyl chloride resins; polyamides, and poly(amide-ester) elastomers; crosslinked trans-polyisoprene and blends thereof; polyester-based thermoplastic elastomers; polyurethane-based thermoplastic elastomers; synthetic or natural vulcanized rubber; ionomers; and combinations thereof. A non-limiting example of a commercially available ethylene methyl acrylate copolymers suitable for use in the composition of the present disclosure includes Optema™ EMA copolymer resins available from ExxonMobil Corporation of Irving, Texas. Another non-limiting example of a commercially available ethylene acrylate copolymer includes Lotader™ ethylene acrylic terpolymer resins available from SK Functional Polymer of Courbevoie, France. When an ethylene methyl acrylate copolymer is used as the base polymer, the ethylene methyl acrylate copolymer may have an acrylic content of about 5 percent to about 40 percent or about 10 percent to about 30 percent or about 10 percent to about 25 percent or about 15 percent to about 30 percent or about 10 percent to about 20 percent or about 15 percent to about 25 percent or about 20 percent to about 30 percent by weight acrylic.

In some embodiments, the base polymer may be an ionomer. Ionomers suitable for use in accordance with the present disclosure may include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized.

In some embodiments, ionomers for use as the base polymer include salts of O/X- and O/X/Y-type acid copolymers, wherein O is an α-olefin, X is a C3-C8 α, β-ethylenically unsaturated carboxylic acid, and Y is a softening monomer. In this aspect, O may be selected from ethylene and propylene. X may be selected from methacrylic acid, acrylic acid, ethacrylic acid, crotonic acid, and itaconic acid. In one embodiment, X is methacrylic acid or acrylic acid. Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. In some aspects, α, B-ethylenically unsaturated mono- or dicarboxylic acids include (meth) acrylic acid, ethacrylic acid, maleic acid, crotonic acid, fumaric acid, itaconic acid, and combinations thereof. As used herein, "(meth) acrylic acid" means methacrylic acid and/or acrylic acid. Likewise, "(meth) acrylate" means methacrylate and/or acrylate.

In some embodiments, the base polymer may be included in the composition in an amount of about 90 to about 100 percent by weight. In one embodiment, the base polymer is included in the composition in an amount of about 90 percent to about 99.9 percent or about 92 percent to about 97 percent or about 90 percent to about 95 percent or about 93 percent to about 95 percent or about 90 percent to about 93 percent or about 92 percent to about 94 percent by weight base polymer. In another embodiment, the base polymer is included in the composition in an amount of about 95 percent to about 99.9 percent or about 96 percent to about 99 percent or about 95 percent to about 98 percent or about 97 percent to about 99 percent. In a further embodiment, the base polymer may be included in the composition in an amount of about 96 percent to about 99.9 percent or about 97 percent to about 99.9 percent or about 98 percent to about 99.9 percent or about 99 to about 99.9 percent or about 98 to about 99.5 percent or about 98 percent to about 99 percent or about 98.5 to about 99.5 percent base polymer.

Compositions of the present disclosure may include a diene crosslinking agent. As discussed in more detail below, in some embodiments, the diene crosslinking agent may be grafted onto the polymer chains of the base polymer to form diene functional groups on the base polymer that create one or more chemical bonds with one or more dienophile crosslinking agents or dienophile functional groups on the base polymer in the composition of the same component or in the composition of other components to crosslink the composition(s). In other embodiments, the diene crosslinking agent may react with two or more dienophile functional groups on the base polymer in the composition of the same component or in the composition of different components to crosslink the composition(s) without being grafted onto the base polymer.

In some embodiments, the diene crosslinking agent may be a diene. A diene may refer to an alkene having two carbon-carbon double bonds. As used herein, a diene may also include polyenes having more than two carbon-carbon double bonds, such as trienes and tetraenes, as such compounds contain at least two carbon-carbon double bonds and may have similar functionality to a diene. In some embodiments, the diene crosslinking agent may be a conjugated diene. For example, in embodiments where the diene crosslinking agent is a polyene having more than two carbon-carbon double bonds, at least two of the carbon-carbon double bonds may be conjugated. The diene crosslinking agent may also be a dual reactive crosslinking agent. As used herein, a dual reactive diene crosslinking agent is a compound having at least four carbon-carbon double bonds with the carbon-carbon double bonds grouped into sets of at least two conjugated carbon-carbon double bonds. In such embodiments, the diene crosslinking agent may be capable of reacting with two discrete dienophile crosslinking agents or dienophile functional groups. For example, in some embodiments, based on the conjugated carbon-carbon double bonds, the diene crosslinking agent is capable of reacting with two separate or distinct dienophile crosslinking agents. In other embodiments, the presence of the conjugated carbon-carbon double bonds in the diene crosslinking agent allows it to react with two distinct dienophile functional groups.

Suitable dienes for use in accordance with the present disclosure may vary in structure based on the desired characteristics of the golf ball. For example, suitable dienes may be aromatic or aliphatic in nature. Suitable dienes that are aliphatic dienes may include carbon chains of varying length. For example, a suitable aliphatic diene may have a carbon chain including 4 to 24 carbon atoms. As another example, suitable aliphatic dienes that are dual reactive may have a carbon chain including 10 to 24 carbon atoms. In embodiments using an aliphatic dual reactive diene, the sets of at least two conjugated carbon-carbon double bonds may be separated by 2 to 12 carbon atoms that are not part of a carbon-carbon double bond. Suitable dienes are preferably cis oriented or capable of taking on a cis orientation with respect to at least two of the carbon-carbon double bonds. Non-limiting examples of dienes for use with the present invention include 1,3-butadiene, isoprene, pentadiene, hexadiene, heptadiene, octadiene, cyclopentadiene, cyclohexadiene, furans, pyrroles, pyrans, thiophene, pyrrolizine, indole, isoindole, indazole, quinoline, isoquinoline, quinazoline, modiolin, or mixtures thereof. Suitable dienes may also include derivatives of such dienes. For example, suitable furans for use with the present invention may include furan and furan families of molecules including furfural, furfural resin, furfuryl alcohol, furfuryl alcohol resin, methyl furan, dimethyl furan, furaldehyde, furfurylamine, acetylfuran, furoic acid, 5-hydroxymethyl-2-furaldehyde, and mixtures thereof.

The diene crosslinking agent may be included in the composition in varying amounts depending on the desired characteristics of the golf ball. In some embodiments, the diene crosslinking agent may be included in the composition in a concentration of about 0.1 percent to about 20.0 percent by weight. In one embodiment, the diene crosslinking agent is included in the composition in a concentration of about 0.1 percent to about 2.5 percent or about 2.5 percent to about 5.0 percent or about 1.0 percent to about 4.0 percent or about 2.0 percent to about 3.0 percent or about 0.5 percent to about 2.5 percent or about 0.5 percent to about 1.5 percent or about 1.0 percent to about 2.0 percent or about 0.5 percent to about 1.0 percent by weight diene crosslinking agent. In another embodiment, the diene crosslinking agent is included in the composition in a concentration of about 0.1 percent to about 4.5 percent or about 0.1 percent to about 4.0 percent or about 0.1 percent to about 3.0 percent or about 0.1 percent to about 2.0 percent or about 0.1 percent to about 1.0 percent or about 0.1 percent to about 0.5 percent by weight diene crosslinking agent. In a further embodiment, the diene crosslinking agent is included in the composition in a concentration of about 2.0 percent to about 5.0 percent or about 2.0 percent to about 4.0 percent or about 3.0 percent to about 5.0 percent or about 3.0 percent to about 4.0 percent or about 3.5 percent to about 4.5 percent or about 4.0 percent to about 5.0 percent by weight diene crosslinking agent. In yet another embodiment, the diene crosslinking agent is included in the composition in a concentration of about 1.0 percent to about 20.0 percent or about 1.0 percent to about 15.0 percent or about 3.0 percent to about 7.0 percent or about 5.0 percent to about 15.0 percent or about 5.0 percent to about 10.0 percent or about 7.0 percent to about 12.0 percent or about 10.0 percent to about 15.0 percent by weight diene crosslinking agent. In still another embodiment, the diene crosslinking agent is included in the composition in a concentration of about 5.0 percent to about 8.0 percent or about 7.0 percent to about 10.0 percent or about 9.0 percent to about 12.0 percent or about 10.0 percent to about 13.0 percent or about 12.0 percent to about 15.0 percent by weight diene crosslinking agent.

In some embodiments, more than one type of diene crosslinking agent may be included in the composition, i.e., the composition may include a first diene crosslinking agent in a first diene crosslinking agent concentration and a second diene crosslinking agent in a second diene crosslinking agent concentration. In this aspect, the ratio of the first diene crosslinking agent concentration (in percent by weight) to the second diene crosslinking agent concentration (in percent by weight) may be about 20:1 to about 1:1. In some embodiments, the ratio of the first diene crosslinking agent concentration to the second diene crosslinking agent concentration may be about 20:1 to about 2:1 or about 15:1 to about 3:1 or about 15:1 to about 3:1 or about 12:1 to about 5:1 or about 10:1 to about 5:1. In other embodiments, the ratio of the first diene crosslinking agent concentration to the second diene crosslinking agent concentration may be about 15:1 to about 5:1 or about 15:1 to about 7:1 or about 15:1 to about 10:1 or about 15:1 to about 12:1 or about 13:1 to about 7:1 or about 10:1 to about 7:1. In further embodiments, the ratio of the first diene crosslinking agent concentration to the second diene crosslinking agent concentration may be about 10:1 to about 1:1 or about 7:1 to about 1:1 or about 5:1 to about 1:1 or about 5:1 to about 2:1 or about 7:1 to about 3:1 or about 5:1 to about 3:1. In some embodiments, the first and second diene crosslinking agents may be dienes that are similar in nature. For example, the first and second diene crosslinking agents may both be aromatic or aliphatic dienes. In other embodiments, the first and second diene crosslinking agents may differ in nature. For example, the first diene crosslinking agent may be an aromatic diene, and the second diene crosslinking agent may be an aliphatic diene.

Compositions of the present disclosure may include a dienophile crosslinking agent. As discussed in more detail below, in some embodiments, the dienophile crosslinking agent may be grafted onto the polymer chains of the base polymer to form diene functional groups on the base polymer that create one or more chemical bonds with one or more diene crosslinking agents or diene functional groups on the base polymer in the composition of the same component or in the composition of other components to crosslink the composition(s). In other embodiments, the dienophile crosslinking agent may react directly with two or more diene functional groups on the composition of the same component or in the composition of different components to crosslink the composition(s) without being grafted onto the base polymer.

In some embodiments, the dienophile crosslinking agent is an alkene or an alkyne. Suitable dienes for use in accordance with the present disclosure may vary in structure based on the desired characteristics of the golf ball. For example, an alkene used as the dienophile crosslinking agent may be a monoene, diene, triene, tetraene, or other polyenes. When the dienophile crosslinking agent is a polyene, it may be an isolated polyene, a conjugated polyene, or a combination thereof. In some embodiments, the dienophile crosslinking agent may be a substituted alkene. Suitable alkenes for use as the dienophile crosslinking agent may also be aromatic or aliphatic in nature. Similarly, an alkyne used as the dienophile crosslinking agent may be a monoyne, diyne, triyne, tetrayne, or other polyynes. When the dienophile crosslinking agent is a polyyne, it may be an isolated polyyne, a conjugated polyyne, or a combination thereof. The dienophile crosslinking agent may also be a dual reactive dienophile crosslinking agent. As used herein, a dual reactive dienophile crosslinking agent is a compound having at least two carbon-carbon double and/or triple bonds that are capable of reacting with two discrete diene crosslinking agents or diene functional groups. For example, in some embodiments, based on the nature of the carbon-carbon bonds in a dual reactive dienophile crosslinking agent, it is capable of reacting with two separate or distinct diene crosslinking agents. In other aspects, the carbon-carbon bonds in the dual reactive dienophile crosslinking agent allows it to react with two distinct diene functional groups. Suitable dienophile crosslinking agents may be aromatic or aliphatic in nature. In this aspect, suitable dienophile crosslinking agents that are aliphatic in nature may have a carbon chain including 2 to 24 carbon atoms. In embodiments using an aliphatic, dual reactive dienophile crosslinking agent, the carbon-carbon double and/or triple bonds may be separated by 1 to 20 carbon atoms that are not part of a carbon-carbon double or triple bond.

Non-limiting examples of dienophiles for use with the present invention include ethene, ethyne, propene, propyne, butene, butyne, penetene, pentyne, cyclopentadiene, maleimide, isomaleimide, bismaleimide, citraconimide, itaconimide, crotonate, cinnamate, maleate, fumarate, acrylate, di-acrylate methacrylate, 1,6-hexanediol diacrylate, cyanoacrylate, benzoquinone, benzoquinone oxime, benzoquinone imine, naphthaquinone, alkylidene malonate, (meth)acrylamide, alkynes containing electron withdrawing group, or mixtures thereof. Suitable dienophiles may also include derivatives of such dienophiles. For example, suitable maleimides for use with the present invention may include maleimide, maleimide alcohol, maleimide ether, N-hydroxymaleimide, maleic acid, 3-maleimidopropionic acid, N-[2-(2-bromoisobutyryloxy) ethyl] maleimide (BiBEMI), isomaleimide, and mixtures thereof.

The dienophile crosslinking agent may be included in the composition in varying amounts depending on the desired characteristics of the golf ball component formed from the composition. In some embodiments, the dienophile crosslinking agent may be included in the composition in a concentration of about 0.1 to about 20.0 percent by weight. In one embodiment, the dienophile crosslinking agent is included in the composition in a concentration of about 0.1 percent to about 2.5 percent or about 2.5 percent to about 5.0 percent or about 1.0 percent to about 4.0 percent or about 2.0 percent to about 3.0 percent or about 0.5 to about 2.5 percent or about 0.5 percent to about 1.5 percent or about 1.0 percent to about 2.0 percent or about 0.5 percent to about 1.0 percent by weight dienophile crosslinking agent. In another embodiment, the dienophile crosslinking agent is included in the composition in a concentration of about 0.1 percent to about 4.5 percent or about 0.1 percent to about 4.0 percent or about 0.1 percent to about 3.0 percent or about 0.1 percent to about 2.0 percent or about 0.1 percent to about 1.0 percent or about 0.1 to about 0.5 by weight dienophile crosslinking agent. In a further embodiment, the dienophile crosslinking agent is included in the composition in a concentration of about 2.0 percent to about 5.0 percent or about 2.0 percent to about 4.0 percent or about 3.0 percent to about 5.0 percent or about 3.0 percent to about 4.0 percent or about 3.5 percent to about 4.5 percent or about 4.0 percent to about 5.0 percent by weight dienophile crosslinking agent. In yet another embodiment, the dienophile crosslinking agent is included in the composition in a concentration of about 1.0 percent to about 20.0 percent or about 1.0 percent to about 15.0 percent or about 3.0 percent to about 7.0 percent or about 5.0 percent to about 15.0 percent or about 5.0 percent to about 10.0 percent or about 7.0 percent to about 12.0 percent or about 10.0 percent to about 15.0 percent by weight dienophile crosslinking agent. In still another embodiment, the dienophile crosslinking agent is included in the composition in a concentration of about 5.0 percent to about 8.0 percent or about 7.0 percent to about 10.0 percent or about 9.0 percent to about 12.0 percent or about 10.0 percent to about 13.0 percent or about 12.0 percent to about 15.0 percent by weight dienophile crosslinking agent.

In some embodiments, more than one type of dienophile crosslinking agent may be included in the composition, i.e., the composition may include a first dienophile crosslinking agent in a first dienophile crosslinking agent concentration and a second dienophile crosslinking agent in a second dienophile crosslinking agent concentration. In this aspect, the ratio of the first dienophile crosslinking agent concentration (in percent by weight) to the second dienophile crosslinking agent concentration (in percent by weight) may be about 20:1 to about 1:1. In some embodiments, the ratio of the first dienophile crosslinking agent concentration to the second dienophile crosslinking agent concentration may be about 20:1 to about 2:1 or about 15:1 to about 3:1 or about 15:1 to about 3:1 or about 12:1 to about 5:1 or about 10:1 to about 5:1. In other embodiments, the ratio of the first dienophile crosslinking agent concentration to the second dienophile crosslinking agent concentration may be about 15:1 to about 5:1 or about 15:1 to about 7:1 or about 15:1 to about 10:1 or about 15:1 to about 12:1 or about 13:1 to about 7:1 or about 10:1 to about 7:1. In further embodiments, the ratio of the first dienophile crosslinking agent concentration to the second dienophile crosslinking agent concentration may be about 10:1 to about 1:1 or about 7:1 to about 1:1 or about 5:1 to about 1:1 or about 5:1 to about 2:1 or about 7:1 to about 3:1 or about 5:1 to about 3:1.

In some embodiments, the first and second dienophile crosslinking agents may be dienophiles that are similar in nature. For example, the first and second dienophile crosslinking agents may both be aromatic or aliphatic dienophiles or may both be alkenes or alkynes. In other embodiments, the first and second dienophile crosslinking agents may differ in nature. For example, the first dienophile crosslinking agent may be an aromatic dienophile, and the second dienophile crosslinking agent may be an aliphatic dienophile. As another example, the first diene crosslinking agent may be an alkene, and the second dienophile crosslinking agent may be an alkyne.

In some embodiments, the diene crosslinking agent may be included in the composition of a first component in stoichiometric excess to the dienophile crosslinking agent. For example, the diene crosslinking agent may be included in stoichiometric excess to the dienophile crosslinking agent when the dienophile crosslinking agent is dual reactive. In embodiments including the diene crosslinking agent in stoichiometric excess to the dienophile crosslinking agent, a dienophile crosslinking agent may also be included in the compositions of adjacent components to allow for the formation of crosslinks both within the composition of the first component and between the compositions of the first component and adjacent components.

In other embodiments, the dienophile crosslinking agent may be included in the composition of a first component in stoichiometric excess to the diene crosslinking agent. For example, the dienophile crosslinking agent may be included in stoichiometric excess to the diene crosslinking agent when the diene crosslinking agent is dual reactive. In embodiments including the dienophile crosslinking agent in stoichiometric excess to the diene crosslinking agent, a dienophile crosslinking agent may also be included in the compositions of adjacent components to allow for the formation of crosslinks both within the composition of the first component and between the compositions of the first component and adjacent components.

In this aspect, the ratio of the diene crosslinking agent concentration (in mole) to the dienophile crosslinking agent concentration (in mole) may be about 2.5:1 to about 1:2.5. In some embodiments, the ratio of the diene crosslinking agent concentration to the dienophile crosslinking agent concentration may be about 1.05:1 to about 2.5:1 or about 1.5:1 to about 2.5:1 or about 1.8:1 to about 2.2:1 or about 1.05:1 to about 2:1 or about 1.2:1 to about 2:1 or about 1.5:1 to about 2:1 or about 1.3:1 to about 1.7:1 or about 1.05:1 to about 1.5:1 or about 1.05:1 to about 1.2:1 or about 1.1:1 to about 1.3:1 or about 1.2:1 to about 1.5:1. In other embodiments, the ratio of the diene crosslinking agent concentration to the dienophile crosslinking agent concentration may be about 1:1.05 to about 1:2.5 or about 1:1.5 to about 1:2.5 or about 1:1.8 to about 1:2.2 or about 1:1.05 to about 1:2 or about 1:1.2 to about 1:2 or about 1:1.5 to about 1:2 or about 1:1.3 to about 1:1.7 or about 1:1.05 to about 1:1.5 or about 1:1.05 to about 1:1.2 or about 1:1.1 to about 1:1.3 or about 1:1.2 to about 1:1.5.

Compositions of the present disclosure also may include "fillers," which are added to adjust the density and/or specific gravity of the composition. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. The amount and type of fillers utilized are governed by the amount and weight of other ingredients in the golf ball, since a maximum golf ball weight of 45.93 g (1.62 ounces) has been established by the United States Golf Association (USGA).

In some embodiments, the composition of the present disclosure includes rubber regrind as a filler. Rubber regrind is ground, recycled rubber material obtained from discarded rubber golf ball cores. In some embodiments, the rubber material that is ground into the rubber regrind is composed of a composition of the present disclosure. For example, the rubber regrind may include a polymer having diene and dienophile functional groups crosslinking the polymer. Without being bound by any particular theory, using rubber regrind composed of a polymer having diene and dienophile functional groups may be beneficial as the rubber regrind may crosslink with the diene and dienophile functional groups on the base polymer of the new composition to integrate the rubber regrind into the new composition.

When used as a filler, the rubber regrind may be used in an amount ranging from about 1 percent to about 15 percent by weight rubber regrind. In some embodiments, the rubber regrind is included in the composition in a concentration of about 1.0 percent to about 10 percent or about 1.0 percent to about 5.0 percent or about 3.0 percent to about 7.0 percent or about 5.0 percent to about 10.0 percent by weight rubber regrind. In other embodiments, the rubber regrind is included in the composition in a concentration of about 5.0 percent to about 15 percent or about 8.0 percent to about 12.0 percent or about 10.0 percent to about 15.0 percent by weight rubber regrind.

Crosslinking Via Diels-Alder Reactions

As briefly discussed above, when diene and dienophile crosslinking agents are included in the composition of a golf ball component, the diene and/or dienophile crosslinking agents may facilitate the formation of diene functional groups and/or dienophile functional groups, respectively, on the base polymer of the composition. When both diene and dienophile functional groups are formed on the base polymer, the diene and dienophile functional groups may react to create one or more chemical bonds between such diene and dienophile functional groups to crosslink the composition of the component. When only diene functional groups are formed on the base polymer, the dienophile crosslinking agent may react with the diene functional groups on the base polymer to crosslink the base polymer. When only dienophile functional groups are formed on the base polymer, the diene crosslinking agent may react with the dienophile functional groups on the base polymer to crosslink the base polymer. Without being bound to any particular theory, the crosslinks formed in the composition of the same component may modify the hardness or the resiliency of such component (as compared to components made from conventional compositions).

In some embodiments, the diene and dienophile crosslinking agents may also be included in the compositions of different components to facilitate the formation of diene functional groups and/or dienophile functional groups on the base polymers in the compositions of the different components. When both diene and dienophile functional groups are formed, the diene functional groups and dienophile functional groups in the different components may react to crosslink the base polymers of the different components. When only diene functional groups are formed on the base polymer in the composition(s) of one or more components, a dienophile crosslinking agent included in the composition(s) of one or more components may react with the diene functional groups to crosslink the components. When only dienophile functional groups are formed on the base polymer in the composition(s) of one or more components, a diene crosslinking agent included in the composition(s) of one or more components may react with the diene functional groups to crosslink the components. Without being bound to any particular theory, crosslinks formed between compositions of different components may increase the interlayer adhesion or shear durability of a golf ball made from such components (as compared to components made from conventional compositions).

In some embodiments, the diene and/or dienophile crosslinking agents may be selected to have functionality in addition to the diene or dienophile functional groups that allows for the diene and/or dienophile crosslinking agents to be grafted onto the polymer chains of the base polymer. For example, in some embodiments, the base polymer may include ester functional groups and the diene and dienophile crosslinking agents may include hydroxyl functional groups. In such embodiments, the diene and dienophile crosslinking agents may be grafted onto the polymer chains of the base polymer via transesterification. In other embodiments, the diene and/or dienophile crosslinking agents may be monomers that are capable of polymerizing to form the base polymer. In such embodiments, the base polymer may be a copolymer.

The diene functional groups formed on the base polymer by the diene crosslinking agent may have the functionality of C=C—C=C. The dienophile functional groups formed on the base polymer by the dienophile crosslinking agent may have the functionality of C=C or C≡C. The diene and dienophile functional groups may also contain any number of other substituents or n-functional groups. To form crosslinks between the base polymer(s), the diene functional groups may undergo a Diels-Alder reaction with the dienophile functional group. In embodiments where the dienophile crosslinking agent is not grafted onto a base polymer, the dienophile crosslinking agent may undergo Diels-Alder Reactions with multiple diene functional groups to form crosslinks between the base polymer(s). In embodiments where the diene crosslinking agent is not grafted onto a base polymer, the diene crosslinking agent may undergo Diels-Alder Reactions with multiple dienophile functional groups to form crosslinks between the base polymer(s). In either scenario, the base polymer(s) may become crosslinked via one or more of the following linkages:

where R1 and R2 connect to the polymer chains of the base polymer(s). In some embodiments, R1 and R2 may connect to the same polymer chain. In other embodiments, R1 and R2 may connect to different polymer chains in the same component. In further embodiments, R1 may connect to a polymer chain in one component, and R2 may connect to a polymer chain in a different component. One or more of the carbon atoms shown in the linkages above may have additional functional groups or substituents. The number of crosslinks formed within a composition or between the compositions of different components may depend on the type and amount of diene and dienophile crosslinking agents used and, as discussed below, the rate of cooling of the composition when forming a golf ball component from the composition.

Without being bound to any particular theory, forming crosslinks within the composition of a component or between the compositions of different components in accordance with the present disclosure forms a Covalent Adaptable Network (CAN) within or between such components. Generally, adaptable networks are materials with crosslinks that are dynamic (i.e., reversible) under specific stimuli. In CANs, the crosslinks may be dynamic covalent bonds, also referred to as reversible covalent linkages. Dynamic covalent bonds may alternate between open (dissociated) and closed (associated) states in response to stimuli, such as heat or light. In other words, the crosslinks of a CAN may decouple when subjected to a stimulus and may re-couple when such stimulus is removed. For example, in a thermo-reversible CAN, the dynamic covalent bonds may alternate between open and closed states in response to heat (i.e., temperature changes).

In the case of CANs formed using Diels-Alder reactions, the dynamic covalent bonds are thermo-reversible. In other words, the crosslinks in a CAN formed using Diels-Alder reactions may decouple via the retro Diels-Alder reaction when the CAN is heated and may reform via the Diels-Alder reaction as the CAN cools, according to the reaction:

Thus, when a golf ball component is formed from a composition in accordance with the present disclosure, the component may include a CAN with crosslinks that decouple as the component is heated and may couple as the component cools.

The presence of reversible crosslinks formed from dynamic covalent bonds in CANs imbues CANs with characteristics of both thermoplastic and thermoset materials. Typically, thermoplastics contain unlinked polymer chains that may freely migrate throughout the material. Thermoplastics are characterized as being readily melted, deformed, and processed in the molten state. In contrast, thermoset materials are typically formed from polymers chains that have been crosslinked to bind the polymeric matrix into a single molecular unit. Thermosets are characterized by exceptional thermal, chemical, and dimensional stability due to the permanent network structure. However, thermoset materials are virtually unrecyclable except through use as filler materials or decomposition through specialized chemical processes.

CANs may behave like a thermoplastic material when most or all of the dynamic covalent bonds are in an open state and may behave more like a thermoset material when most or all of the dynamic covalent bonds are in a closed state. Thus, when a golf ball component made in accordance with the present disclosure is cooled and the crosslinks are coupled, the golf ball component may behave as a thermoset material and may have a desired hardness and coefficient of resiliency, as discussed below. In contrast, when such a golf ball component is heated, the golf ball component may behave as a thermoplastic material and may have increased processability and may be partially or fully recyclable. As discussed in greater detail below, a CAN may behave as a hybrid thermoplastic/thermoset material when the dynamic covalent bonds are in an equilibrium between the open and closed states (i.e., a transition state).

The coupling temperature is the temperature below which the diene and dienophile crosslinking agents and/or diene and dienophile functional groups exhibit a degree of coupling sufficient to imbue a golf ball or golf ball component with desired properties. For example, below the coupling temperature, the degree of coupling of the diene and dienophile crosslinking agents or diene and dienophile functional groups may be about 5 percent or greater, 10 percent or greater, 20 percent or greater, 30 percent or greater, 40 percent or greater, 50 percent to greater, 60 percent or greater, 70 percent or greater, 80 percent or greater, 90 percent or greater, about 95 percent or greater, about 99 percent or greater, about 99.5 percent or greater, or about 99.9 percent or greater at equilibrium. Depending on the type of diene and dienophile crosslinking agent used to form the diene and dienophile functional groups, the coupling temperature may be in the range of, for example, about 20° C. to about 90° C. In some embodiments, the coupling temperature is in the range of about 20° C. to about 70° C. or about 30° C. to about 80° C. or about 40° C. to about 90° C. or about 50° C. to about 90° C. In other embodiments, the coupling temperature is in the range of about 20° C. to about 50° C. or about 40° C. to about 70° C. or about 60° C. to about 90° C. In further embodiments, the coupling temperature is in the range of about 20° C. to about 40° C. or about 40° C. to about 60° C. or about 50° C. to about 70° C. or about 60° C. to about 80° C. or about 70° C. to about 90° C. In still further embodiments, the coupling temperature is in the range of about 50° C. to about 60° C. or about 55° C. to about 65° C. or about 60° C. to about 70° C. or about 65° C. to about 75° C. or about 70° C. to about 80° C. or about 75° C. to about 85° C. or about 80° C. to about 90° C. Without being bound to any particular theory, a composition made in accordance with the present disclosure may behave as a thermoset material when the composition is cooled below the coupling temperature. It may be desirable to select the diene and dienophile crosslinking agents such that the coupling temperature is sufficiently high so that the diene and dienophile functional groups formed on the base polymer of the composition do not decouple during normal use of a golf ball component made from the composition.

The decoupling temperature is the temperature above which the diene and dienophile crosslinking agents and/or diene and dienophile functional groups are significantly decoupled. For example, above the decoupling temperature, the degree of coupling of the diene and dienophile crosslinking agents or diene and dienophile functional groups may be about 95 percent or less, about 90 percent or less, about 80 percent or less, about 70 percent or less, about 60 percent or less, about 50 percent or less, about 40 percent or less, about 30 percent or less, about 20 percent or less, about 10 percent or less, about 5 percent or less, about 1 percent or less, about 0.5 percent or less, or about 0.1 percent or less at equilibrium. As another example, above the decoupling temperature, the number of crosslinks may be about 90 percent or less, about 80 percent or less, about 70 percent or less, about 60 percent or less, about 50 percent or less, about 40 percent or less, about 30 percent or less, about 20 percent or less, about 10 percent or less, about 5 percent or less, or about 1 percent or less than the number of crosslinks present when the composition is above the coupling temperature.

The decoupling temperature may be in the range of, for example, about 100° C. to about 170° C. In some embodiments, the decoupling temperature is in the range of about 100° C. to about 150° C. or about 110° C. to about 160° C. or about 120° C. to about 170° C. or about 130° C. to about 170° C. In other embodiments, the decoupling temperature is in the range of about 100° C. to about 130° C. or about 120° C. to about 150° C. or about 140° C. to about 170° C. In further embodiments, the coupling temperature is in the range of about 100° C. to about 120° C. or about 120° C. to about 140° C. or about 130° C. to about 150° C. or about 140° C. to about 160° C. or about 150° C. to about 170° C. In still further embodiments, the coupling temperature is in the range of about 130° C. to about 140° C. or about 135° C. to about 145° C. or about 140° C. to about 150° C. or about 145° C. to about 155° C. or about 150° C. to about 160° C. or about 155° C. to about 165° C. or about 160° C. to about 170° C. Without being bound to any particular theory, a composition made in accordance with the present disclosure may behave as a thermoplastic material when the composition is heated above the decoupling temperature. It may be desirable to select the diene and dienophile crosslinking agents such that the decoupling temperature is low enough that the diene and dienophile functional groups formed on the base polymer of the composition may be decoupled without burning or degrading other materials in the composition or materials in other golf ball components when forming a golf ball component from the composition.

The coupling and decoupling temperatures of the diene and dienophile functional groups formed on the base polymer of the composition of the present disclosure may be the same as or similar to that of the diene and dienophile crosslinking agents. However, the rate of coupling of the diene and dienophile functional groups may also be influenced by other factors such as the type and amount of base polymer used, the stoichiometry of the diene and dienophile crosslinking agents included in the composition, and the rate of cooling of the composition when forming a golf ball component from the composition.

When a composition of the present disclosure is heated to a temperature between the coupling and decoupling temperature, the composition may enter a transition state in which there may be partial decoupling of the crosslinks in the composition. For example, in the transition state, the diene and dienophile crosslinking agents or diene and dienophile functional groups may couple at a rate of about 0.1 percent to about 99.9 percent or about 0.5 percent to about 99.5 percent or about 1.0 to about 99.0 percent or about 5.0 to about 95.0 percent or about 10.0 to about 90.0 percent. When in a transition state, the composition may exhibit characteristics of both thermoplastic and thermoset materials. For example, when in a transition state, the composition may exhibit greater thermal, chemical, and dimensional stability than a thermoplastic material and may more be readily deformed and processed than a thermoset material. The behavior of the composition in the transition state may also be characterized as a spectrum. For example, when a composition of the present disclosure is heated into a transition state but at a temperature closer to the coupling temperature than the decoupling temperature, the composition may exhibit behavior that is more like a thermoset material than a thermoplastic material. In contrast, when a composition of the present disclosure is heated into a transition state at a temperature closer to the decoupling temperature than the coupling temperature, the composition may exhibit behavior that is more like a thermoplastic material than a thermoset material.

The properties of golf ball components formed from compositions in accordance with the present disclosure and golf balls containing such components may be tailored by heating the golf ball component and then controlling the rate of cooling of the golf ball component. When a golf ball component formed from a composition of the present disclosure is allowed to cool slowly, the diene and dienophile functional groups may couple to a higher degree than when the golf ball component is cooled rapidly. Moreover, the temperature to which the golf ball component is heated prior to cooling the golf ball may also affect the rate of coupling of the diene and dienophile functional groups in the composition of the component. For example, when the golf ball or golf ball component is initially formed, heating the golf ball component to a relatively low temperature and then rapidly cooling the golf ball component may result in a lower degree of coupling of the diene and dienophile functional groups in the composition of the golf ball component than when the golf ball component is heated to a relatively high temperature and then rapidly cooled. After the golf ball or golf ball component is initially formed, heating the golf ball component to a relatively low temperature and then rapidly cooling the golf ball component may result in a higher degree of coupling of the diene and dienophile functional groups in the composition of the golf ball component than when the golf ball component is heated to a relatively high temperature and then rapidly cooled. Without being bound to a particular theory, a golf ball component having a higher degree of coupling of the diene and dienophile functional groups (i.e., a higher degree of crosslinking) may have a greater hardness and CoR as compared to a golf ball component having a lower degree of coupling of the diene and dienophile functional groups (with all other factors being held constant). Similarly, golf ball components having a higher degree of coupling of the diene and dienophile functional groups (i.e., a higher degree of crosslinking) between components may have a greater adhesion strength and shear durability as compared to golf ball components having a lower rate of coupling of the diene and dienophile functional groups (with all other factors being held constant).

For example, a golf ball or golf ball component formed in accordance with the present disclosure or a golf ball including such component may be tailored to have a desired hardness or coefficient of restitution by heating the golf ball or golf ball component to between about 80° C. to about 210° C. and rapidly cooling the golf ball or golf ball component. In some embodiments, a golf ball or golf ball component formed in accordance with the present disclosure is heated to about 80° C. to about 140° C. or about 90° C. to about 150° C. or about 100° C. to about 160° C. or about 110° C. to about 170° C. or about 130° C. to about 190° C. or about 150° C. to about 210° C. and then rapidly cooled. In other embodiments, a golf ball or golf ball component formed in accordance with the present disclosure is heated to about 80° C. to about 110° C. or about 100° C. to about 130° C. or about 120° C. to about 150° C. or about 140° C. to about 170° C. or about 160° C. to about 190° C. or about 180° C. to about 210° C. and then rapidly cooled. In further embodiments, a golf ball or golf ball component formed in accordance with the present disclosure is heated to about 90° C. to about 110° C. or about 110° C. to about 130° C. or about 130° C. to about 150° C. or about 150° C. to about 170° C. or about 170° C. to about 190° C. or about 190° C. to about 210° C. and then rapidly cooled. In still further embodiments, a golf ball or golf ball component formed in accordance with the present disclosure is heated to about 90° C. to about 100° C. or about 100° C. to about 110° C. or about 110° C. to about 120° C. or about 120° C. to about 130° C. or about 140° C. to about 150° C. or about 150° C. to about 160° C. or about 160° C. to about 170° C. or about 170° C. to about 180° C. or about 180° C. to about 190° C. or about 190° C. to about 200° C. or about 200° C. to about 210° C. and then rapidly cooled. When the golf ball or golf ball component is rapidly cooled, the golf ball component may be cooled to or below the coupling temperature or room temperature (i.e., about 20° C.).

In one aspect, the properties of golf balls and golf ball components formed in accordance with the present disclosure may be modified in order to compensate for changes in such properties due to the presence of various additives. For example, in some prior art compositions, the amount of rubber regrind that could be included in the composition was limited because of the effect of the rubber regrind on the hardness and CoR of such compositions. However, in compositions of the present disclosure, the amount of rubber regrind may not be so limited as the hardness and CoR of such compositions can be tailored to a desired value.

In another aspect, the properties of golf ball components formed in accordance with the present disclosure and golf balls containing such components may be modified without requiring complete reconstruction of the golf ball or golf ball component. Particularly, the properties of golf balls or golf ball components of the present disclosure, such as the hardness or resiliency, may be modified by heating and cooling the golf ball or golf component as previously discussed. For example, if a particular golf ball or golf ball component has an unsatisfactory hardness or CoR, the golf ball or golf ball component may be heated to between about 80° C. to about 170° C. and rapidly cooled to produce a desired hardness or CoR.

Golf Balls

Golf balls having various constructions may be made in accordance with the present disclosure. For example, golf balls having one-piece, two-piece, three-piece, four-piece, and five or more-piece constructions with the term "piece" referring to any core, cover, or intermediate layer of a golf ball construction. Representative illustrations of such golf ball constructions are provided and discussed further below. The term, "layer" as used herein means generally any spherical portion of the golf ball. In some embodiments, golf balls formed in accordance with the present disclosure have a casing layer and/or a cover layer formed from a composition of the present disclosure.

Figure 1:
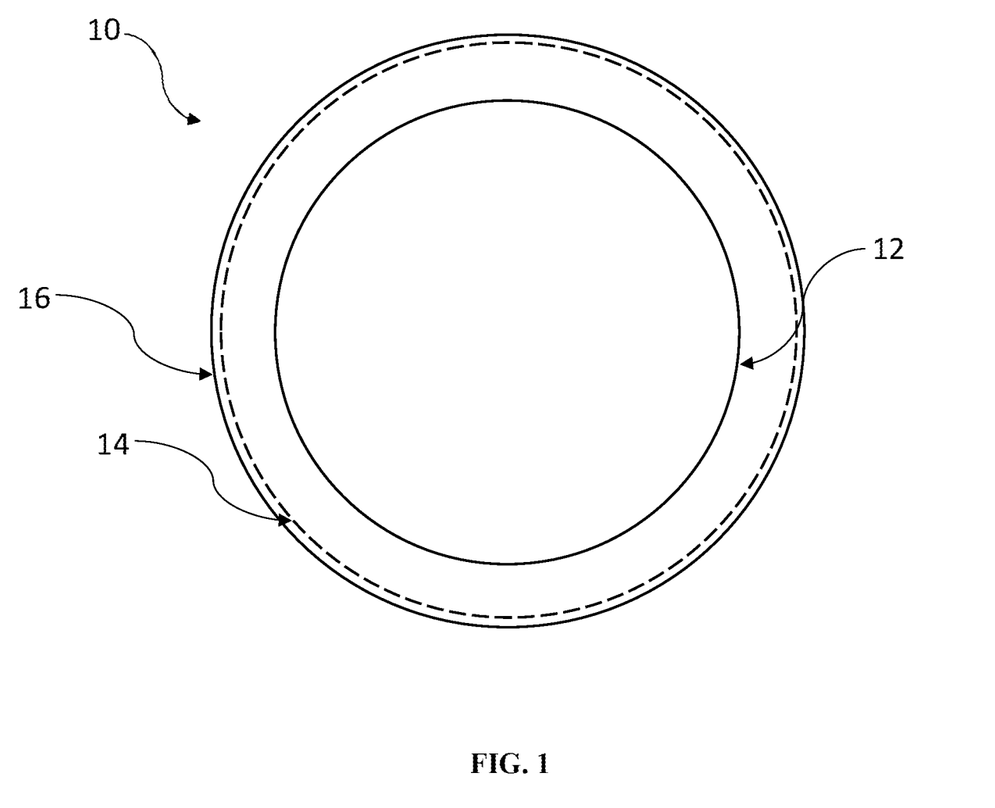
FIG. 1 is a cross-sectional view of a three-piece golf ball assemblage in accordance with an embodiment of the present disclosure.
Figure 2:
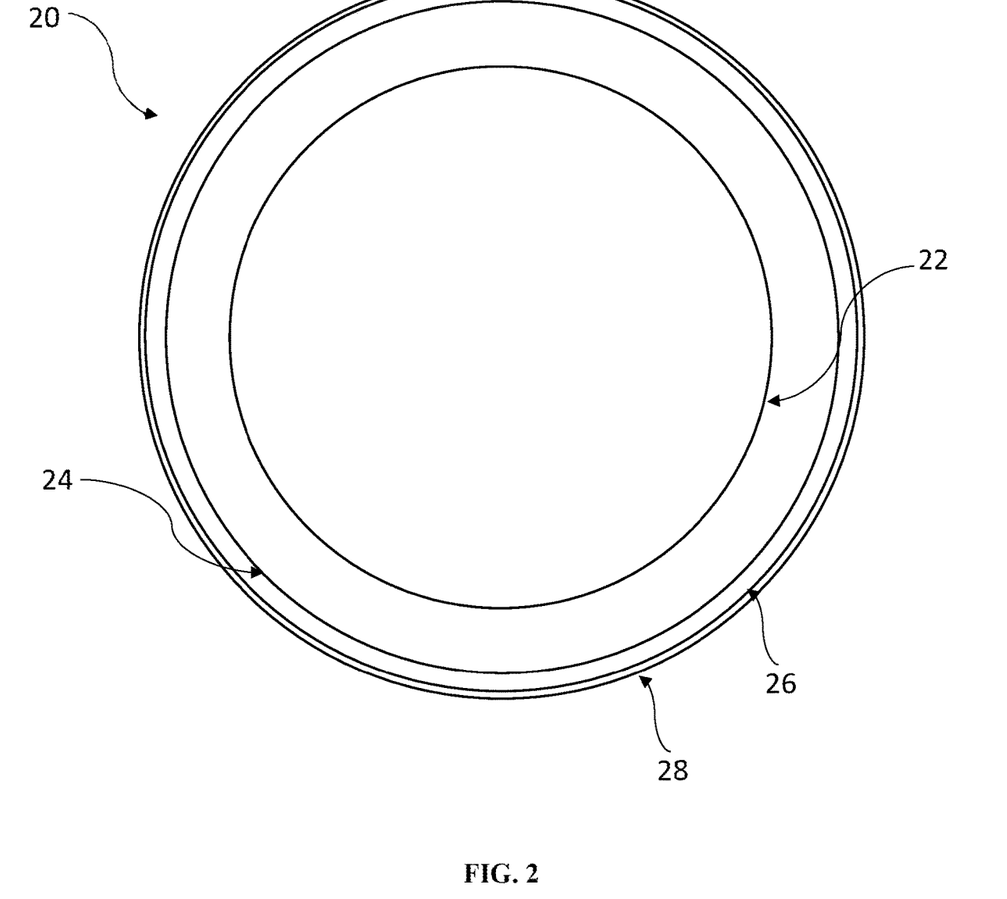
FIG. 2 is a cross-sectional view of a four-piece golf ball in accordance with an embodiment of the present disclosure.
Figure 3:
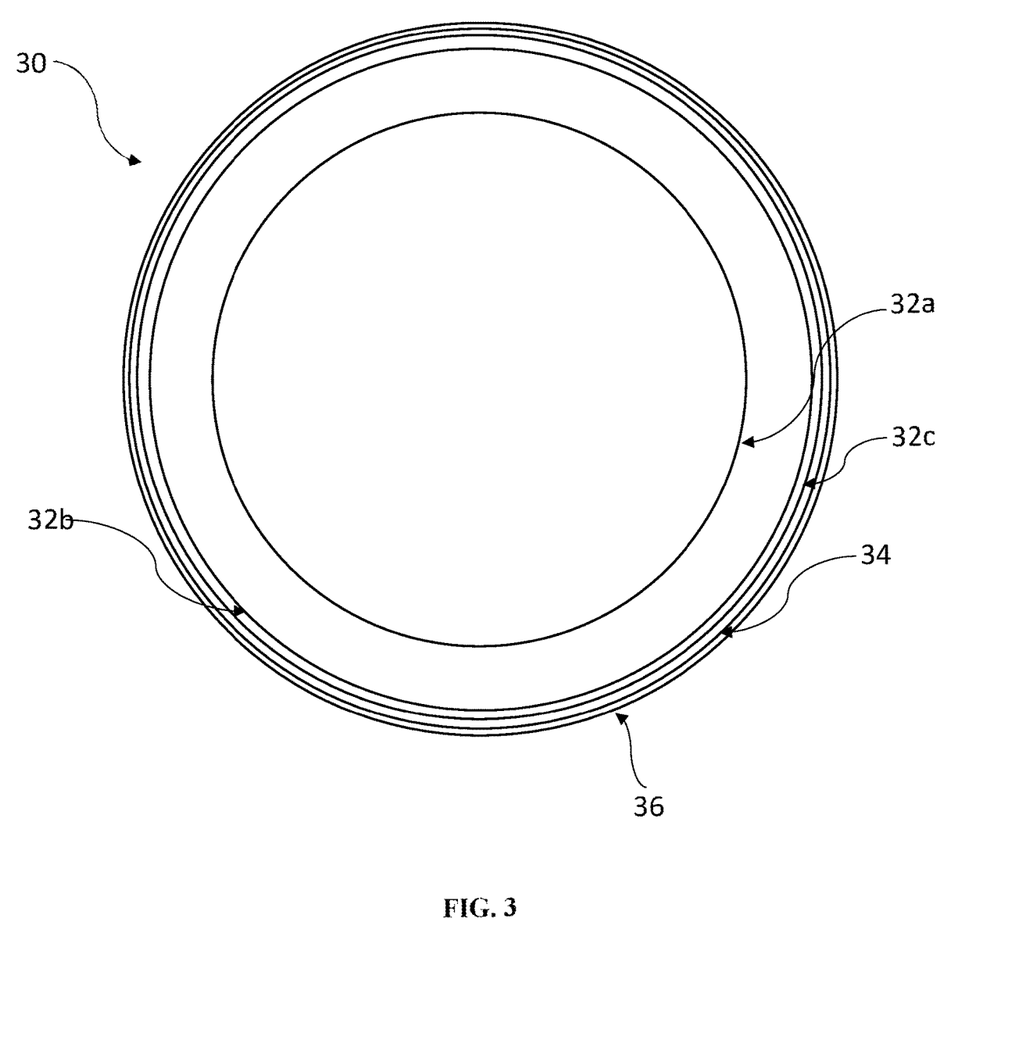
FIG. 3 is a cross-sectional view of a five-piece golf ball in accordance with an embodiment of the present disclosure.

In one embodiment, a golf ball of the present disclosure is a one-piece ball where the core and cover form a single integral layer. In another embodiment, a golf ball of the present disclosure is a two-piece ball including a core and a single cover layer. Referring to FIG. 1, in a further embodiment, a three-piece golf ball 10 can be made in accordance with this invention. The ball 10 contains a core 12, a cover 16, and a casing layer 14 disposed between the core 12 and the cover 16. Referring to FIG. 2, in still another embodiment, a four-piece golf ball 20 can be made in accordance with this invention. The ball 20 contains a center 22, an outer core layer 24, a cover 28, and a casing layer 26 disposed between the outer core layer 24 and the cover 28. Referring to FIG. 3, in still another embodiment, a five-piece golf ball 30 contains a core 32 including a center 32a, an outer core layer 32c, and an inner core layer 32b disposed between the center 32a and the outer core layer 32c, a cover 36, and a casing layer 34 disposed between the core 32 and the cover 36. In any of these embodiments, the casing layer 14, 26, and 34 may be considered to be or referred to as an intermediate layer, mantle layer, or inner cover layer, or any other layer disposed between the core assemblage and the outer cover of the ball. In any of these embodiments, the cover 16, 28, or 36 may be formed from a composition of the present disclosure. Similarly, in any of these embodiments, the casing layer 14, 26, or 34 may be formed from a composition of the present disclosure. In still other embodiments, the cover 16, 28, or 36 and the casing layer 14, 26, or 34 may each be formed from a composition of the present disclosure.

Indeed, in some embodiments, a golf ball made in accordance with the present disclosure may include a casing layer formed from a composition crosslinked with diene and dienophile functional groups. For example, the composition of the casing layer may include a base polymer that is an ethylene methyl acrylate copolymer. The ethylene methyl acrylate copolymer may have an acrylic content of about 10 percent to about 30 percent by weight. In the same embodiment, the composition of the casing layer may further include a diene crosslinking agent and a dienophile crosslinking agent. In some aspects, the diene crosslinking agent may be furfuryl alcohol or 2-furoic acid. In other aspects, the dienophile crosslinking agent may be maleimide alcohol or a diacrylate molecule such as, but not limited to, 1,6-hexanediol diacrylate. Furfuryl alcohol and maleimide alcohol may be grafted onto the polymer chains of the ethylene methyl acrylate copolymer via transesterification to form pendent diene and dienophile functional groups. The pendent diene and dienophile functional groups formed from furfuryl alcohol and maleimide alcohol may undergo a Diels-Alder reaction with each other to crosslink the casing layer.

As discussed above, the casing layer of this embodiment may be tailored to have a desired hardness and coefficient of resiliency based on the heating and cooling of the casing layer. Moreover, the casing layer of this embodiment may have improved processability and may be partially or completely recyclable without the need to grind the casing layer into regrind or use specialized chemical processing.

In other embodiments, a golf ball made in accordance with the present disclosure may include a casing layer formed from a composition including diene or dienophile functional groups and a cover layer formed from a composition including dienophile or diene functional groups, respectively. In one example, the composition of the casing layer may include a base polymer that is an ethylene methyl acrylate copolymer and a diene crosslinking agent that is furfuryl alcohol. The furfuryl alcohol may be grated onto the polymer chains of the ethylene methyl acrylate copolymer via transesterification to form pendent diene functional groups. In the same example, the composition of the cover layer may include a base polymer that is a polyurethane and a dienophile crosslinking agent that is a maleimide derivative, such as maleimide alcohol. The maleimide crosslinking agent may be grafted onto the polymer chains of the polyurethane to form pendent dienophile functional groups.

The diene functional groups in the composition of the casing layer may undergo a Diels-Alder reaction with the dienophile functional groups in the composition of the cover layer to form crosslinks between the casing layer and cover layer. As discussed above, crosslinking the casing and cover layers may increase the adhesion strength between the casing and cover layers and the shear durability of a golf ball formed from such casing and cover layers.

In further embodiments, a golf ball made in accordance with the present disclosure may include a cover layer formed from a composition crosslinked with diene and dienophile functional groups. For example, the composition of the cover layer may include a base polymer that includes polyethylene. As another example, the composition of the cover layer may include a base polymer that is a polyurethane, polyurea, or hybrid of polyurethane and polyurea. In either example, the composition of the cover layer may further include a diene crosslinking agent and a dienophile crosslinking agent. In some aspects, the diene crosslinking agent may be a furan derivative, such as furfuryl alcohol. In other aspects, the dienophile crosslinking agent may be a maleimide derivative, such as maleimide alcohol. Furfuryl alcohol and maleimide alcohol may be grafted onto the polymer chains of the base polymer to form pendent diene and dienophile functional groups. The pendent diene and dienophile functional groups formed from furfuryl alcohol and maleimide alcohol may undergo a Diels-Alder reaction with each other to crosslink the cover layer.

While the compositions discussed herein are suitable for use in golf ball casing and/or cover layers, it is also contemplated that the compositions of the present disclosure may be used to form one or more other layers of any of the one, two, three, four, or five, or more-piece (layered) balls described above. That is, any of the core layers, intermediate layers, and/or cover layers may be formed from the compositions of this disclosure.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In another embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of the formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inches to about 1.60 inches. In one embodiment, the core has a diameter of about 1.52 inches to about 1.58 inches. In another embodiment, the core diameter ranges from about 1.54 inches to about 1.56 inches.

When a casing or cover layer of a golf ball of the present disclosure is not formed from a composition containing diene or dienophile functional groups as discussed above, such layer(s) may be formed from a variety of materials including any of the base polymers discussed above in the context of the rubber formulation of the core, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; crosslinked trans-polyisoprene and blends thereof; polyester-based thermoplastic elastomers; polyurethane-based thermoplastic elastomers; synthetic or natural vulcanized rubber; and combinations thereof.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a casing layer disposed on the core formed from a composition of the present disclosure, and a cover formed from a composition of the present disclosure, and the cover has a hardness that is less than that of the casing layer. For example, the casing layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D or about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

When a dual cover is disposed about the core, the casing layer may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.500 (as measured per the test methods below). In some embodiments, the CoR is at least 0.700, 0.750, or 0.800 (as measured per the test methods below). For example, in some embodiments, the CoR of a finished golf ball formed in accordance with the present disclosure may range from about 0.500 to about 0.750 or about 0.700 to about 0.950. In other embodiments, the CoR of a finished golf ball formed in accordance with the present disclosure may range from about 0.750 to about 0.950. In still other embodiments, the CoR of a finished golf ball made from the core composition of the present disclosure at 125 ft/s is about 0.770 or greater, or about 0.780 or greater, or about 0.790 or greater. In another embodiment, the CoR of a finished golf ball at 125 ft/s is about 0.770 or greater, or about 0.780 or greater, or about 0.790 or greater. In yet another embodiment, the CoR of a finished golf ball at 125 ft/s is about 0.800 or greater, or about 0.810 or greater, or about 0.820 or greater. In still another embodiment, the overall CoR of a finished golf ball at 125 ft/s is about 0.830 or greater, or about 0.840 or greater, or about 0.850 or greater. In a further embodiment, the CoR of a finished golf ball at 125 ft/s is about 0.860 or greater, or about 0.880 or greater, or about 0.900 or greater. Such a CoR allows players to generate greater ball velocity off the tee and achieve greater distance with their drives. At the same time, a golf ball including a cover formed from a composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of a shear stress to that golf ball, is preferably comparable or greater than a golf ball formed with conventional compositions. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

TABLE 1

Shear Durability Rating Scale

| Rating | Cut/Damaged Cover | Abrasion Type Damage | Paint Damage |
|---|---|---|---|
| 1 | Cut or Cracked Cover with casing layer exposed | | |
| 2 | Severe cover damage with multiple groove marks and deep gouges | | |
| 3 | Moderate cover damage with more than one groove mark, missing or severely raised cover material | | |
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |

TABLE 1-continued

Shear Durability Rating Scale

| Rating | Cut/Damaged Cover | Abrasion Type Damage | Paint Damage |
|---|---|---|---|
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one hit is made on each of about 6 to 12 substantially identical golf balls of substantially the same composition with either a sand wedge or a pitching wedge. After a suitable calibration procedure, each experimental golf ball may be tested and assigned a rating based upon visible manifestations of damage after being struck. The shear durability rating for a golf ball with a particular cover represents a numerical average of all the tested substantially identical golf balls. An alternative way to test shear resistance of a golf ball cover involves using player-testing and evaluating the results after the ball is struck multiple times with wedges and/or short irons.

Exposing a golf ball to a high moisture environment, such as by soaking the golf ball or storing the golf ball in high humidity for an extended period, may decrease the durability of a golf ball. Accordingly, in some testing procedures, the golf balls may be soaked in water or stored at a high humidity for an extended period prior to testing each golf ball in order to simulate the durability of the golf ball over an extended period of time or in extreme conditions.

In one embodiment, a golf ball formed in accordance with the present disclosure, i.e., with a cover formed of a composition and a casing layer formed of a composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover formed of a composition and a casing layer formed of a composition as disclosed herein, has a shear durability rating of at least 8.

In some aspects, the shear durability of a golf ball formed in accordance with the present invention, i.e., with one or more layers formed from a composition as disclosed herein, is comparable to or better than a golf ball with a conventional casing layer and cover (holding all of the other ball components constant). In one embodiment, the shear durability of a golf ball formed in accordance with the present invention, i.e., with one or more layers formed from a composition as disclosed herein, is about 102 percent or more of the shear durability of a golf ball with a conventional casing layer and cover (holding all of the other ball components constant). In another embodiment, the shear durability of a golf ball formed in accordance with the present invention, i.e., with one or more layers formed from a composition as disclosed herein, is about 105 percent or more of the shear durability of a golf ball with a conventional casing layer and cover (holding all of the other ball components constant). In still another embodiment, the shear durability of a golf ball formed in accordance with the present invention, i.e., with one or more layers formed from a composition as disclosed herein, is about 110 percent or more of the shear durability of a golf ball with a conventional casing layer and cover (holding all of the other ball components constant).

The adhesion strength between adjacent layers formed from compositions of the present disclosure is preferably comparable or greater than the adhesion strength of a casing and cover layer of a golf ball formed with conventional compositions. The adhesion strength between two layers of a golf ball is the force required to separate the two layers. As used herein, the adhesion strength is preferably measured using a finished golf ball having adjacent layers formed from compositions of the present disclosure with adjacent layers being crosslinked as disclosed herein. However, the adhesion strength of a golf ball of the present disclosure may be measured using subassemblies of the golf ball, such as a casing layer made from a composition of the present disclosure disposed on a golf ball core formed from a composition of the present disclosure.

Skilled artisans are aware of methods to determine the adhesion strength. One commonly used test for measuring adhesion strength is the repeated ball impact test. The repeated impact test consists of subjecting the finished golf ball to impact repeatedly and visually examining the coating film for peeling from the golf ball. To make the repeated ball impact test reproducible, the test may be carried out using a pneumatic cannon or similar device to propel the balls a 125 feet per second against a rigid wall at an angled of 45 degrees relative to the wall. The ball may be impacted in this manner 100, 200, or 300 or more times depending on the desired level of testing.

When golf balls are formed with the compositions of the present disclosure, there are preferably no cracks or crazes after about 100 hits or more. In one embodiment, the compositions of the present disclosure prevent cracks or crazes until after about 200 hits or more. In still another embodiment, golf balls formed with the compositions of the present disclosure do not have any cracks or crazes until after about 300 hits or more. In yet another embodiment, golf balls formed with the compositions of the present disclosure do not have any cracks or crazes until after about 600 hits or more.

The adhesion strength of a layer of the golf ball may also be measured as the force required to pull apart two layers of the golf ball. A common test for measuring adhesion strength as the force required to pull apart two layers of the golf ball is the peel test. To conduct the peel test, a strip of approximately ½ inch is cut around an equator of the golf ball, deep enough to cut through the entire layer to be tested. Next, a perpendicular cut is made across the strip and one end of the strip is peeled back just enough to make a tab of about ½ inch. The ball is then clamped into a jig by poles with the tab facing upward. The jig allows the clamped ball to freely rotate about an axis parallel to the poles. The tab is then clamped to a 20 lb. load cell of a universal testing machine. The tab is pulled away from the ball at a rate of 0.5 in./min., and the force required to pull the outer layer off of the underlying layer is recorded.

The adhesion strength between layers of the golf ball formed from the compositions of the present disclosure may be about 5 lb/in or greater, about 10 lb/in or greater, about 18 lb/in or greater, about 25 lb/in or greater, or about 30 lb/in or greater. In one embodiment, the adhesion strength between layers of a golf ball formed from the compositions of the present disclosure is about 5 lb/in to about 40 lb/in or about 10 lb/in to about 40 lb/in or about 10 lb/in to about 30 lb/in or about 15 lb/in to about 40 lb/in. In another embodiment, the adhesion strength of a layer of a golf ball formed from the compositions of the present disclosure is about 18 lb/in to about 40 lb/in or about 18 lb/in to about 30 lb/in or about 18 lb/in to about 25 lb/in or about 22 lb/in to about 35 lb/in or about 25 lb/in to about 40 lb/in or about 30 lb/in to about 40 lb/in The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core assemblage using any suitable technique that is associated with the material used to form the layer. For example, the compositions of the present disclosure may be formed into one or more layers of a golf ball by conventional compression or injection molding techniques.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and top-coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core;
   a casing layer disposed on the core and formed from a composition comprising a base polymer, diene functional groups, and dienophile functional groups, wherein the diene functional groups and dienophile functional groups are linked to the base polymer via ester groups, and wherein the diene and dienophile functional groups are crosslinked; and
   a cover disposed on the casing layer.

2. The golf ball of claim 1, wherein the composition comprises a covalent adaptable network.

3. The golf ball of claim 2, wherein the composition comprises a thermo-reversible covalent adaptable network.

4. The golf ball of claim 1, wherein the diene and dienophile functional groups are crosslinked via a Diels-Alder reaction and form dynamic covalent bonds.

5. The golf ball of claim 1, wherein the diene functional groups are formed from a dual reactive diene crosslinking agent and the dienophile functional groups are formed from a dual reactive dienophile crosslinking agent.

6. The golf ball of claim 5, wherein the base polymer is selected from the group consisting of polyethylene, polyacrylate, and hybrids, copolymers, and blends thereof.

7. The golf ball of claim 5, wherein the base polymer comprises an ionomer.

8. The golf ball of claim 1, wherein the diene functional groups are formed from a furan derivative.

9. The golf ball of claim 1, wherein the dienophile functional groups are formed from a maleimide derivative.

10. The golf ball of claim 1, wherein the diene functional groups are selected from the group consisting of furfuryl alcohol, furfuryl alcohol resin, furaldehyde, furoic acid, 5-hydroxymethyl-2-furaldehyde, and mixtures thereof, and wherein the dienophile functional groups are selected from the group consisting of maleimide alcohol, maleimide ether, N-hydroxymaleimide, maleic acid, 3-maleimidopropionic acid, N-[2-(2-bromoisobutyryloxy) ethyl] maleimide (BiBEMI), and mixtures thereof.

11. A golf ball, comprising:

a core;

a casing layer disposed on the core and formed from a composition comprising a base polymer, diene functional groups, and dienophile functional groups, wherein the diene functional groups and dienophile functional groups are attached to the base polymer via ester groups, and wherein a ratio of the diene functional groups concentration (in mole) to the dienophile functional groups concentration (in mole) may be about 2.5:1 to about 1:2.5; and a cover disposed on the casing layer, wherein the base polymer includes the following linkage:

12. The golf ball of claim 11, wherein the linkage is a dynamic covalent bond.

13. The golf ball of claim 11, wherein the base polymer is selected from the group consisting of polyethylene, polyacrylate, and hybrids, copolymers, and blends thereof.

14. The golf ball of claim 11, wherein the diene functional groups are formed from a furan derivative.

15. The golf ball of claim 11, wherein the dienophile functional groups are formed from a maleimide derivative.

* * * * *